United States Patent

[11] 3,548,145

| [72] | Inventors | Jean Bender<br>Hanau;<br>Paul Himmelstein, Frankfurt am Main;<br>Horst Kuhn, Hanau; Wilhelm Schaefer,<br>Steinheim; Gunther Schneider,<br>Langenselbold, Germany |
|---|---|---|
| [21] | Appl. No. | 758,301 |
| [22] | Filed | Sept. 9, 1968 |
| [45] | Patented | Dec. 15, 1970 |
| [73] | Assignee | Nukem, Nuklear-Chemie und-Metallurgie Gesellschaft mit beschrankter Haftung, Wolfgang bei Hanau am Main, Germany |
| [32] | Priority | Sept. 14, 1967 |
| [33] | | Germany |
| [31] | | No. 1,690,630 |

[54] METHOD OF ARC IGNITION
3 Claims, 2 Drawing Figs.

[52] U.S. Cl. ................................................ 219/137, 219/131

[51] Int. Cl. ................................................ B23k 9/00

[50] Field of Search .......................................... 219/131, 135, 137, 127, 74

[56] References Cited
UNITED STATES PATENTS

| 2,924,750 | 2/1960 | Mulder | 219/135X |
| 2,933,594 | 4/1960 | Johnson et al. | 219/72X |
| 3,459,996 | 8/1969 | Adamson et al. | 219/135X |
| 2,758,186 | 8/1956 | Ludwig | 219/74 |
| 2,791,673 | 5/1957 | Arnaud | 219/135X |
| 3,277,269 | 10/1966 | Zeller | 219/127 |

*Primary Examiner*—J. V. Truhe
*Assistant Examiner*—C. L. Albritton
*Attorneys*—Francis D. Stephens and Hugo Huettig, Jr.

ABSTRACT: In starting an arc between a welding rod and a workpiece with no contact therebetween when welding in inert gas, a starting voltage about three times the welding voltage is used. This prevents damage to the workpiece and a longer welding rod life.

PATENTED DEC 15 1970

3,548,145

INVENTORS
Jean Bender
Paul Himmelstein
Horst Kühn
Wilhelm Schaefer
Günther Schneider

METHOD OF ARC IGNITION

This invention relates to a method of starting an arc during welding under inert gas without contact being made between the welding rod and the workpiece. Ordinarily, when welding in the process known as Wolfram-Electrode under Inert Gas, known as WIG, the electric arc is started by quickly touching the point of the electrode rod to the workpiece. However, this method is disliked by the technicians in the art because, above all, of the danger that the electrode rod fuses to the workpiece and because the welding seam is disfigured by the electrode rod material. The method of starting the electric arc on a metallic workpiece, as, for example, a copper plate lying close to the workpiece which is being welded, by touching the electrode rod to the plate and then drawing the arc over onto the welding groove can only be used for coarse work in which a uniform and clean welding seam is of little importance. When operating in such manner, it must be taken into consideration that the point of the electrode rod becomes damaged or that the welding seam is contaminated by the alloying of the electrode rod with the workpiece.

The practice of starting the electric arc without contact with the workpiece has been used with the required ionization of the inert gas in the space between the point of the electrode rod and the welding groove being produced by means of a high frequency voltage in a type of Tesla transformer, a so-called HF-ignition, discharged through the gas. Unfortunately, this accepted method is not complete since it does not exclude an occasional misarcing and since it possesses varying arcing effects depending upon the type of protective gas used. This is especially true for the starting of an electric arc in a pure helium atmosphere or, in other words, for the so-called Heliarc-welding. Since the helium electric arc, as opposed to the argon electric arc (Argonarc-method), offers some physical advantages, such as a deeper welding seam or a higher temperature and/or density of voltage, which means a savings of electricity in cheaper low capacity welding installations, as well as a reduced wear and tear on the electrode rod, it seemed that the process for improving the starting of the arc would be first for the Heliarc welding. However, the fact that the Argonarc method currently has a greater popularity is, to some extent, traced back to the disadvantages of the contactless arc starting in Heliarc welding. It is anticipated that, even in the future, the Argonarc welding will be preferred when used, for example, with hand-operated electrode rods since argon, which is heavier than air, covers by gravity the workpiece and the area surrounding the electrode rod in a far better manner than the much lighter helium. However, this is of no significance in the so-called chamber welding. Even though in Europe helium is more expensive than argon, this should not be decisively in favor or Argonarc welding since, on one hand, the influence by supply and demand of the price in the open market and, on the other hand, a certain difference in price because of the aforesaid advantage of Heliarc welding or other saving, such as the quality of the weld, could be compensatory factors.

The requirement for a welding seam in a core element for a reactor is set at $10^{-8}$ Torr $\times$ 1/sec., and in order to test for this, it is necessary to use the mass-spectrometric tester for the leakage of helium. Also, because of a satisfactory heat conductivity of the helium, it is necessary that the space between the core element and the wall of the surrounding chamber be filled with helium so that the advantage of a helium atmosphere is had when the ends of the rods are welded. Thus it is, above all, understood that the makers of reactor core elements using automatic machine Heliarc welding in closed chambers are interested in a safer operation which is increasingly more significant in view of the growing plutonium technology. In the latter, it is necessary to operate without interruptions if possible and also with remote control in order to avoid contamination and the danger of being exposed to direct radiation. The starting in WIG welding, which avoids electrode rod contact and is free from interruptions, is one of the assumptions which must be fulfilled for the use of electric arc welding when the electrode rods contain plutonium. Unfortunately, all heretofore used methods to start the arc under helium and without contact with the workpiece have many disadvantages, such as:

1. The starting of the helium electric arc can be accomplished with ordinary high frequency welding voltages in a HF-starting apparatus if care is taken that all electrically conducting parts are excellently insulated so that there is little loss up to the point of the electrode rod. However, practical experience has led to the realization that such extremely good insulation cannot be guaranteed over an extended operation time. All that is necessary to form a surface leakage current is some dust or moisture condensation. Thus only an insignificant part of the HF voltage reaches the point of the electrode rod which results in a discharge through the gas in the space between the electrode rod and the workpiece which is too weak to start the electric arc.

2. In order to lower the ionization voltage, it is possible to mix another gas, such as argon, to helium so that the arc starting can be done with known high frequency apparatus.
   a. The method of the so-called "Argon Shower" during the starting of the arc changes the welding conditions in an uncontrollable manner since an unknown mixture of helium and argon during welding causes, at least at the beginning, different fusions and penetration by burning. The various characteristics of the pure argon electric arc as opposed to the pure helium electric arc can be explained by the higher energy density of the helium electric arc while using the same current intensity. In other words, for welding grooves of identical size and for comparable welding fusions and penetration depth, only approximately one-half the current intensity is needed for helium than for argon.
   b. The use of a mixed gas, such as 92 He and 8 percent Ar, such as is customarily used in the United States, presupposes that this helium and argon mixture is used in whatever finishing process being made at that time, as for example a filler gas in the electrode rod during the production of core elements in reactors. However, there also exists in each case that the mixture in the gas separates so that, among other things, similar disadvantages occur as set forth in a., supra.

3. When the point of the electrode rod has a small radius, that is, the Wolfram-Electrode is carefully sharpened and given a suitable metal surface, it is possible that the arc starting by means of a HF-discharge can be done without interference. Unfortunately, such a specially prepared electrode can only be used once because such a quick arc starting leads to a roughening of the surface by a pulverization of the cathode at a point where the gases strike so that a new electrode must be inserted after each interruption in the welding. however, especially in view of a substantially uninterrupted and automatic completion of the welding operation, such a method is unusual and extremely time consuming. Also, when welding in a chamber, extensive precautions have to be taken in order to prevent the entry of air and contamination of the helium atmosphere during the constant changing of electrode rods.

4. Instead of using the customary Torr type Wolfram-Electrode rods, efforts have been occasionally made to use electrodes composed of different alloys or having a differently prepared surface. Theoretically, it is actually possible to lessen the discharge of the electrode rod by using other metals or alloys in such a manner that the cluster of electrodes is sufficient to ionize a sufficient number of helium atoms by means of the HF-discharge to start the electric arc. However, currently no usable material for such electrode rods has been found. Special surface preparations have led to similar effects, as the sharpening discussed under 3, supra, so that it is necessary to change the electrode rod after each welding process.

Finally, there are further imaginable processes which are possible to improve the ionization of the helium in the gas chamber so that the starting of the electric arc can be done with a HF-discharge. However, up to the present time, no solutions have been found which are technically practical and economically feasible.

The object of this invention is to produce a method for starting an electric arc between the electrode rod and the workpiece which is economical and can be used continuously and repeatedly in an inert gas without changing the electrode rod after each welding step.

In general, this and other objects are obtained by a relatively simple method in which the electric arc can be started with one electrode rod for several hundred continuous weldings in pure helium. In this invention, the no-load or open-circuit voltage of the welding circuit is increased for a short time period during starting of the electric arc. Preferably, the voltage increase amounts to approximately three times the operating welding voltage. While the normal welding voltage, for safety reasons, is limited to a maximum of 100 volts of DC current or 65 volts of AC current, this voltage increase can be accomplished without violating safety rules since the WIG welding is done only in a chamber and there is no possibility to touch electrical conducting parts during the starting of the arc and welding. There is no danger of an accident to a person doing manual welding as the person does not have access to the chamber. Preferably no change is made in the welding apparatus as a separate starting device is installed in the control circuit box so that when the welding generator is changed from machine operation to manual operation the no-load or open-circuit voltage remains constantly at a permissible value for the manual operation of the apparatus. In this invention, it is also possible to couple two welding apparatuses in series, but it is also possible to use to advantage cheaper sources of auxiliary electricity while at the same time increasing the no-load or open-circuit voltage to approximately 230 volts and to construct simply designed controls in such a manner that the increased no-load voltage is held by a relay to a nominal short period of time of less than 10 milliseconds. The HF-discharge which occurs at the same time is dependent upon the tapping of this increased no-load voltage. The cutting-off of the auxiliary electric circuit is thus accomplished by the nominal value relay which, at a definite ignition current, switches to the welding voltage. Such a switch-over from the starting arc current to welding current corresponds with regard to function and the technique of changeover to an excess current relay such as used in many techniques, thus at a shunt resistance a corresponding voltage falls off at a definite current intensity and this actuates a relay. At the moment welding proceeds from the starting arc, the voltage breaks in the entire system and reaches the value required by the welding conditions.

The means by which the objects of the invention are obtained are described more fully with reference to the accompanying drawings, in which.

Figure 1:
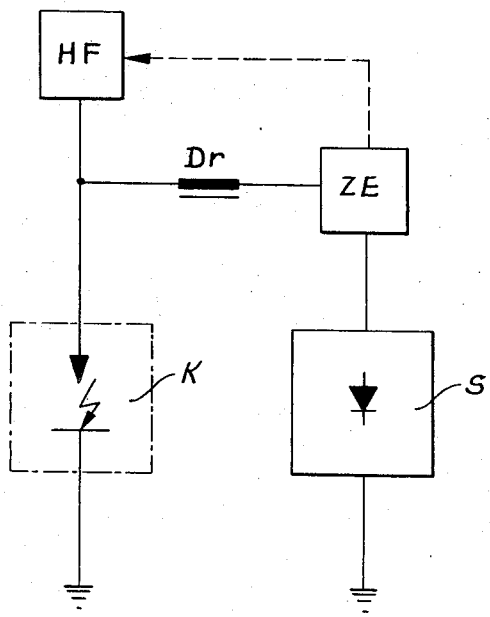
FIG. 1 is a circuit diagram of the circuit of this invention.

As shown in FIG. 1, the initial voltage of the welding equalizer S is supplied by way of the series connected arc starting device ZE and the choke Dr of the welding chamber K and from which the arc starting device ZE is switched on at the same time to the high frequency source HF.

Figure 2:
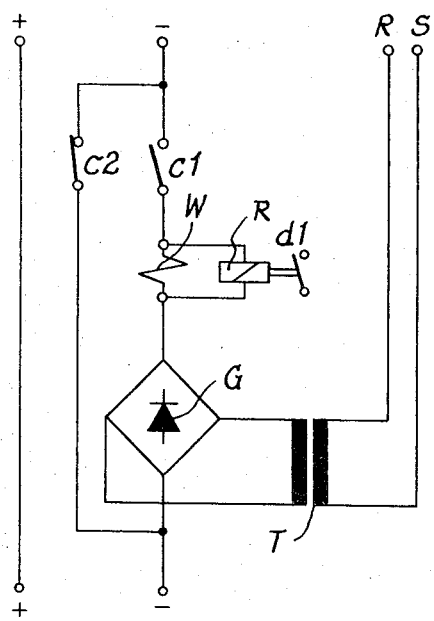
FIG. 2 is a circuit diagram of the control circuit in FIG. 1.

FIG. 2 is a circuit diagram of the arc starting device ZE. Additional voltage is obtained from transformer T and a converter arrangement G joined in the electric circuit between the welding converter and the welding chamber. A resistance W is joined in this circuit and a relay R is coupled parallel thereto. When the voltage reduction at resistance W exceeds a certain adjustable value, then a switch-over to normal operation occurs at once in that contact C1 is opened and contact C2 is closed. There is no wear or tear on any of the structural parts or any influence on the welding converter during the welding of core elements. In use, the Wolfram-Electrode rod in the welding chamber is changed as a matter of routine after fifty weldings. In an automatic welding unit constructed to make continuous tests for determining the wear and tear on the electrode rods, it was found that the first miss in starting the electric arc occurred after approximately 120 to 150 welds and that further misstartings remained under the acceptable limits of 5 percent even after several hundred welds. Finally, it has been found that with this invention it is possible to improve upon the starting of the argon electric arc mainly in the low wear and tear on the electrode rods.

The run of a typical welding process under pure helium atmosphere for sealing the tube with an endplug on a fuel rod of the Pressurized Water Reactor type will be described in the following example:

WORKPIECES TO BE WELDED

Tube with endplug.
Material: Zircaloy-2 (1.5 percent Sn, 0.1 percent Fe, 0.1 percent Cr, 0.05 percent Ni, remainder Zr).
Tube dimensions: Inner diameter 10.35 mm., wall thickness 0.6 mm., length 1.800 mm.
Endplug design: Adjusted plug with conical pin.

EQUIPMENT

Vacuum tight welding chamber with rotating clamping device for the tube.
Welding machine: DC-power supply of commercial size with preset course. High frequency ignition device of commercial quality and additional an ignition apparatus for the claimed method of starting the arc.

WELDING CONDITIONS

Atmosphere: pure helium
Turning speed: 4.1 sec./rev.
Distance between electrode and seam (tube/endplug): 0.5 mm.

The open-circuit voltage is applied during a 1/100 of a second in addition to the high frequency ignition tension. During this period the arc starts immediately to the preselected current of 10 Amps. and a tension of about 17 volts which is a function of the arc length. The programmed current increased during 2 seconds to 16 Amps., slopes down in the next period of 4.5 seconds to 14 Amps. and at least down to zero amps. in 2 seconds.

After a cooling time of 1.5 minutes the welded tube may be removed from the welding chamber to the open air.

We claim:

1. A method of starting an arc between a welding electrode rod and a workpiece in high frequency voltage WIG welding comprising confining the electrode rod and workpiece in a pure helium atmosphere, holding said electrode rod adjacent to and out of contact with said workpiece, and briefly increasing the no-load open-circuit voltage in said electrode rod to about three times that of the no-load open-circuit voltage to produce a starting voltage to start the arc.

2. A method as in claim 1 in which a relay (R) connected in parallel with a resistance (W) in the welding circuit automatically switches the voltage from starting voltage to operating voltage after the arc has been started.

3. A method as in claim 2 in which the initial voltage (S) is connected in series with the arc starting device (ZE).